No. 717,463. Patented Dec. 30, 1902.
C. M. STARNER.
DEVICE FOR HOLDING TIRES.
(Application filed Aug. 6, 1902.)
(No Model.)

Witnesses
Geo. Ackman.
Chas. S. Hyer.

Inventor
Clarence M. Starner,
By Victor J. Evans
Attorney

UNITED STATES PATENT OFFICE.

CLARENCE M. STARNER, OF ALGA, PENNSYLVANIA.

DEVICE FOR HOLDING TIRES.

SPECIFICATION forming part of Letters Patent No. 717,463, dated December 30, 1902.

Application filed August 6, 1902. Serial No. 118,682. (No model.)

*To all whom it may concern:*

Be it known that I, CLARENCE M. STARNER, a citizen of the United States, residing at Alga, in the county of Cumberland and State of Pennsylvania, have invented certain new and useful Improvements in Devices for Holding Tires, of which the following is a specification.

This invention relates to devices for holding and assisting in the insertion of inner tubes in pneumatic tires; and the primary object of the same is to provide a simple and effective device whereby the inner tube may be quickly and readily positioned within the outer tube of a pneumatic tire and said outer tube held in proper shape during such operation.

The invention consists in the construction and arrangement of the several parts which will be more fully hereinafter described and claimed.

Figure 1:
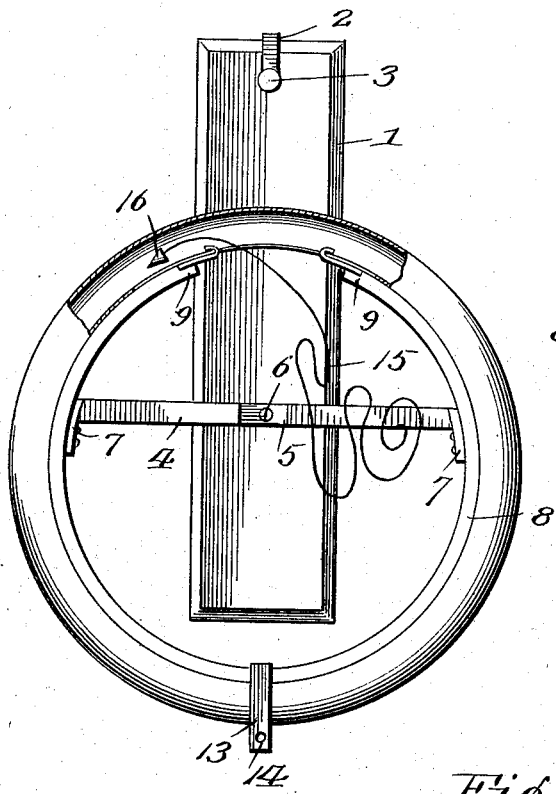
Figure 2:
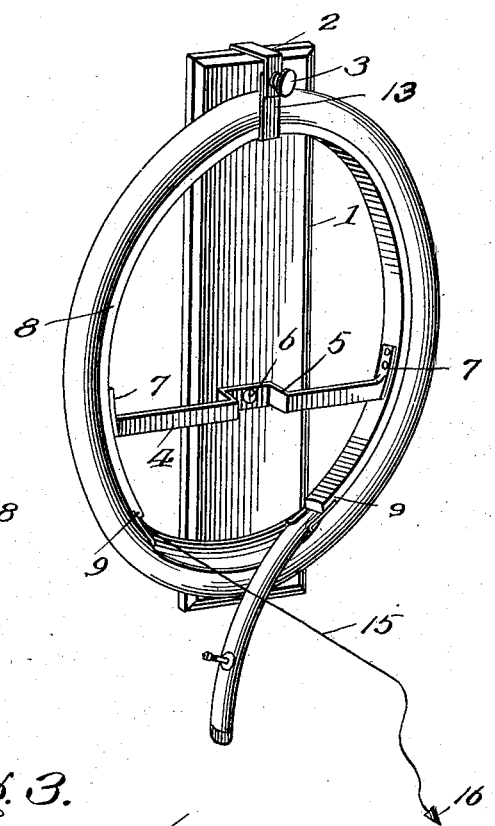
Figure 3:
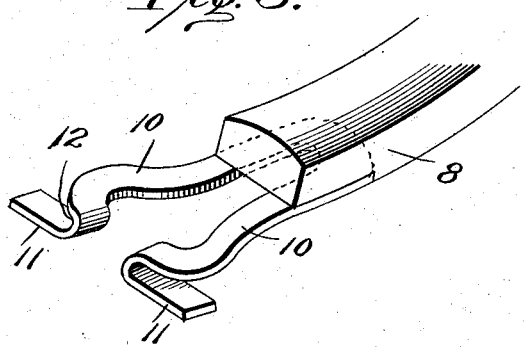

In the drawings, Figure 1 is a front elevation of the improved device, showing the outer tube of a pneumatic tire disposed thereon and partially broken away and indicating the preliminary step of inserting the inner tube thereinto. Fig. 2 is a perspective view of the improved device, showing the inner tube almost completely fitted within the outer tube and the parts of the improvement reversed to accommodate the final securement or sealing of the outer tube. Fig. 3 is an enlarged detail perspective view of one terminal of a part of the improved device, showing the means for holding the outer tube open for a portion of its length during the insertion of the inner tube.

Similar numerals of reference are employed to indicate corresponding parts in the several views.

The numeral 1 designates a support in the form of an elongated strip of suitable material, having an angular arm 2 secured to the upper end thereof and partially depending over the front of the latter and provided with a screw or securing nut 3 in its free end. Pivotally secured to the support 1, closer to the lower than the upper end of the latter, is a fulcrum-bar 4, having a central rearwardly-struck member 5, through which a pivot pin or screw 6 is passed, the said rearwardly-struck member projecting the bar far enough in advance of the front face of the support 1 to accommodate the transverse extent of the tire or outer tube and permit the latter to be rotated over the front face of the support without binding on or frictionally engaging the latter. The opposite ends 7 of the fulcrum-bar are deflected at an angle and secured to the inner side of a shaper 8, consisting of a bar of wood or other material bent into circular form and having a diameter approximating that of the inner diameter of the outer tube or tire when the latter is extended to its normal condition. The shaper 8 has the ends 9 at a distance from each other corresponding to the length of the usual laced opening at the inner portion of the outer tube or tire, so as to leave said opening free for access during the operation of inserting the inner tube within the outer tube, as will be presently explained.

To render the operation of inserting the inner tube in the outer tube more convenient and with less annoyance, it is obvious that the laced opening must be fully extended, and for this purpose a pair of spreading arms 10 is carried by each end 9 of the shaper, and each arm has an outer laterally-projecting terminal 11, formed by bending the arm extremity downwardly and outwardly, the said terminal forming, with the part of the arm thereover, a seat 12, in which is inserted a portion of the one edge of the laced opening of the outer tube. The spreader-arms 10 are so curved that they will project the terminals 11 in lateral directions far enough to force apart the edges of the laced opening to their maximum extent without injury to the outer tube. The arms 10 are in reverse positions in relation to each other, and the terminals 11 extend in reverse lateral directions and in direct transverse alinement in the same plane, and by this means the opposite side edge portions of the opening in the outer tire may be engaged adjacent the terminations of said opening, and thus fully expand the latter. The spreader-arms 10 also operate to hold the outer tube or tire in place on the shaper 8 during the operation of inserting the inner tube in the said outer tube. To hold the shaper against movement during the finishing step in the operation of inserting the tube, it has an outwardly-extending locking-bar 13 at its front side, with a screw-threaded opening 14 in the free end thereof, the said bar moving behind and in close relation to the free angular extremity of the arm 2, so that the screw 3 may be caused to engage the opening 14.

In arranging the improved device for the first step in the operation of inserting the inner tube the fulcrum-bar 4 and the shaper 8 are positioned, as shown by Fig. 1, with the opening in the outer tube above the bar 4. A leader 15, consisting of a suitable length of wire, cord or other material, is then secured to one end of the inner tube, and at the opposite end said leader has a threading head or mouse 16, which is inserted in the outer tube, as shown by Fig. 1. After this preparation the shaper carrying the outer tube is gradually revolved and the head 16 of the leader is threaded through the said outer tube until it arrives at an opposite point in relation to the opening in said outer tube and at which time the said opening will be in a lower position, as shown by Fig. 2. The operator then secures the shaper against movement by causing the screw 3 of the arm 2 to engage the locking-bar 13 and then exerts a pulling tension on the leader 15 and draws the inner tube through the outer tube, and after said tube has been fully placed within the outer tube the closing and final securing operations well known in the art are pursued, as usual. After the operation of inserting the inner tube within the outer tube has been completed the shaper is released from the arm 2 and the completed tire is pulled away from the shaper.

The improved device will be found exceptionally useful and convenient and will facilitate the introduction of an inner and an outer tube by maintaining the outer tube in its normal shape or form during such operation. By applying the fulcrum-bar in eccentric relation to the support 1 the outer tube can be conveniently arranged in the preliminary step of introducing the leader by lowering the upper portion of the tire of the outer tube. When the shaper is turned to the position shown by Fig. 2, the lower portion of the outer tube, as illustrated by Fig. 1, is brought up over the support and the entire outer tube is held in advance of the front face of the support. This is accomplished in addition to the eccentric mounting of the fulcrum-bar 4 in relation to the support 1 by attaching the terminals of the said bar to one side of one of the diameters of the shaper, and by this means the outer tube or tire in the finishing operation is fully supported during the final operation of inclosing the inner tube within the outer tube. Though the preferred form of the device has been shown, it will be understood that changes in the proportions, dimensions, and minor details may be resorted to without departing from the spirit of the invention.

Having thus fully described the invention, what is claimed as new is—

1. In a holding device for a bicycle-tire, the combination of a support, and a shaper for the tire having a fulcrum-bar pivoted below the horizontal center of the support and to one side of one diameter of the shaper.

2. In a holder for a bicycle-tire, the combination of a support, a shaper for a tire having a fulcrum-bar pivoted on the support below the horizontal center of the latter, and securing devices for the shaper in part carried by the shaper and the upper end of the support.

3. In a holder for a bicycle-tire, the combination of a support, a shaper for a tire having a fulcrum-bar pivotally mounted on the said support, the shaper being circular in form and the ends spaced apart from each other, and spreader-arms carried by the terminals of the shaper.

4. In a holder for bicycle-tires and the like, the combination of a support and a shaper for a tire pivotally mounted thereon, the said shaper being circular in form and having the ends spaced apart from each other and provided with spreading elements.

5. In a holder for a bicycle-tire or the like, the combination of a support, and a shaper for a tire pivotally mounted thereon and having pairs of spreader-arms secured to the terminals thereof and provided with laterally-projecting extensions and seats.

6. A holder for a bicycle-tire consisting of a rotatably-supported shaper for a tire and having spreading devices at the terminals thereof.

In testimony whereof I affix my signature in presence of two witnesses.

CLARENCE M. STARNER.

Witnesses:
HARRY E. MCKENZIE,
FRANCIS FRANK.